United States Patent
Sheffield

(10) Patent No.: US 10,840,972 B2
(45) Date of Patent: Nov. 17, 2020

(54) MAINTENANCE OVER AUXILIARY POWER LINE

(71) Applicant: The Boeing Company, Chicago, IL (US)

(72) Inventor: Gregory L. Sheffield, St. Louis, MO (US)

(73) Assignee: THE BOEING COMPANY, Chicago, IL (US)

( * ) Notice: Subject to any disclaimer, the term of this patent is extended or adjusted under 35 U.S.C. 154(b) by 0 days.

(21) Appl. No.: 16/051,430

(22) Filed: Jul. 31, 2018

(65) Prior Publication Data
US 2020/0044692 A1 Feb. 6, 2020

(51) Int. Cl.
*H04B 3/54* (2006.01)
*B64F 5/60* (2017.01)
*G07C 5/00* (2006.01)
*G07C 5/08* (2006.01)

(52) U.S. Cl.
CPC .............. *H04B 3/542* (2013.01); *B64F 5/60* (2017.01); *G07C 5/008* (2013.01); *G07C 5/085* (2013.01); *G07C 5/0808* (2013.01); *G07C 5/0825* (2013.01)

(58) Field of Classification Search
CPC ........... H04B 3/542; B64F 5/60; G07C 5/008; G07C 5/0808; G07C 5/0825; G07C 5/085
See application file for complete search history.

(56) References Cited

U.S. PATENT DOCUMENTS

| 4,675,675 A * | 6/1987 | Corwin | G05B 23/0283 340/945 |
| 4,788,531 A * | 11/1988 | Corwin | H04L 67/125 340/945 |
| 5,023,791 A * | 6/1991 | Herzberg | G05B 23/0256 324/73.1 |
| 5,414,347 A * | 5/1995 | Monk | G06F 30/15 324/73.1 |
| 6,249,913 B1 * | 6/2001 | Galipeau | H04N 7/17318 348/E5.002 |
| 6,813,777 B1 * | 11/2004 | Weinberger | H04B 7/18508 348/E5.008 |
| 9,564,835 B2 * | 2/2017 | Chapman | H02M 7/44 |
| 2003/0093187 A1 * | 5/2003 | Walker | B64C 13/20 701/1 |

(Continued)

FOREIGN PATENT DOCUMENTS

EP 2808195 12/2014

*Primary Examiner* — Behrang Badii
*Assistant Examiner* — Daniel L Greene
(74) *Attorney, Agent, or Firm* — Haynes and Boone, LLP

(57) ABSTRACT

Systems, methods, and apparatus for maintenance over an auxiliary power line are disclosed. In one or more embodiments, a disclosed method for generating and transmitting maintenance data from a unit on a vehicle comprises powering the unit by an auxiliary power line connected to the unit or a primary power line connected to the unit. The method further comprises modulating, by the unit, at least a portion of the maintenance data to generate at least one modulated signal. Further, the method comprises transmitting, from the unit, at least one modulated signal on the auxiliary power line. In one or more embodiments, the maintenance data comprises health management (HM) data, built in test (BIT) data, built in test equipment (BITE) data, and/or configuration data.

20 Claims, 11 Drawing Sheets

(56) References Cited

U.S. PATENT DOCUMENTS

| | | | |
|---|---|---|---|
| 2006/0077607 A1* | 4/2006 | Henricks | G06Q 10/06 |
| | | | 361/93.1 |
| 2007/0241868 A1 | 10/2007 | Fackrell et al. | |
| 2008/0195259 A1* | 8/2008 | Davis | H04B 3/548 |
| | | | 701/1 |
| 2009/0300595 A1* | 12/2009 | Moran | G06F 8/65 |
| | | | 717/170 |
| 2011/0215758 A1* | 9/2011 | Stahlin | G07C 5/008 |
| | | | 320/109 |
| 2012/0168557 A1* | 7/2012 | Edelson | B64C 25/405 |
| | | | 244/50 |
| 2016/0205724 A1* | 7/2016 | Shi | H04B 7/18506 |
| | | | 370/254 |

\* cited by examiner

MAINTENANCE OVER AUXILIARY POWER LINE

FIELD

The present disclosure relates to maintenance for units. In particular, it relates to maintenance over an auxiliary power line for vehicle units.

BACKGROUND

Currently, maintenance data is retrieved from vehicle units (e.g., avionics units) via various different methods. For example, for retrieving tracking data from the units to track the units on a vehicle (e.g., aircraft), it is usually accomplished by physically reading a nameplate or tag off of the unit itself, or by the procedural powering up of the entire vehicle system (e.g., comprising all of the units) to gain access to the individual unit electronically. For gaining access to health monitoring data of the units, typically the practice is to either use a propriety piece of test equipment to obtain the data from the unit, or to pull the unit of interest off of the vehicle platform and connect the unit to a specialized piece of off-board test equipment to extract the health related information. In regards to generation of health indicators for the units, this feature typically does not exist due to the limited available bandwidth within the existing infrastructures and to the cost to coexist with mission or critical data. As such, these conventional methods that are currently used to retrieve maintenance data from units installed on a vehicle are cumbersome and/or costly.

There is therefore a need for an improved simplified technique for retrieving the maintenance data from units installed on a vehicle.

SUMMARY

The present disclosure relates to a method, system, and apparatus for maintenance over an auxiliary power line. In one or more embodiments, a method for retrieving maintenance data from a unit on a vehicle comprises powering the unit by an auxiliary power line connected to the unit or by a primary power line connected to the unit. The method further comprises retrieving, by a digital source controller, the maintenance data off of the unit via the auxiliary power line.

In one or more embodiments, the method further comprises providing power, by the digital source controller, to the auxiliary power line. In at least one embodiment, the method further comprises commanding, by the portable maintenance system, the digital source controller to provide power to the auxiliary power line. In some embodiments, the method further comprises commanding, by the remote maintenance system, the digital source controller to provide power to the auxiliary power line.

In at least one embodiment, the method further comprises providing power, by the vehicle, to the primary power line.

In one or more embodiments, the maintenance data comprises built in test (BIT) data, built in test equipment (BITE) data, health management data, configuration data, at least one hardware (HW) part number, and/or at least one software (SW) version number.

In at least one embodiment, the unit is an onboard maintenance system unit, a safety/mission critical system network unit, a flight management computer, or an avionics unit.

In one or more embodiments, the retrieving of the maintenance data by the digital source controller off of the unit comprises interrogating, by the digital source controller, the unit for the maintenance data; and transmitting, by the unit, the maintenance data to the digital source controller via the auxiliary power line. In some embodiments, the maintenance data is transmitted from the unit to the digital source controller via the auxiliary power line by using broadband over power line (BPL).

In at least one embodiment, the vehicle is an airborne vehicle, a terrestrial vehicle, or a marine vehicle.

In one or more embodiments, the method further comprises retrieving, by a portable maintenance system, the maintenance data off of the digital source controller. In some embodiments, the method further comprises retrieving, by a remote maintenance system, the maintenance data off of the digital source controller.

In at least one embodiment, a system for retrieving maintenance data from a unit on a vehicle comprises an auxiliary power line connected to the unit, and a primary power line connected to the unit. In one or more embodiments, the unit is powered by the auxiliary power line or the primary power line. The system further comprises a digital source controller to retrieve the maintenance data off of the unit via the auxiliary power line.

In one or more embodiments, the digital source controller is operable to provide power to the auxiliary power line. In at least one embodiment, the portable maintenance system is operable configured to command the digital source controller to provide power to the auxiliary power line. In some embodiments, the remote maintenance system is operable to command the digital source controller to provide power to the auxiliary power line. In one or more embodiments, the vehicle provides power to the primary power line.

In at least one embodiment, a method for generating and transmitting maintenance data from a unit on a vehicle comprises powering the unit by an auxiliary power line connected to the unit or a primary power line connected to the unit. The method further comprises modulating, by at least one modulator (e.g., contained within a modem) of the unit, at least a portion of the maintenance data to generate at least one modulated signal. Further, the method comprises transmitting, from the unit, at least one modulated signal on the auxiliary power line.

In one or more embodiments, the method further comprises obtaining, by at least one processor of the unit, the maintenance data for operational electronics of the unit, during an operational mode or a maintenance mode. In some embodiments, the method further comprises storing, in at least one memory of the unit, the maintenance data for operational electronics of the unit, during an operational mode or a maintenance mode.

In at least one embodiment, the maintenance data comprises health management (HM) data, built in test (BIT) data, built in test equipment (BITE) data, and/or configuration data. In one or more embodiments, the HM data, the BIT data, the BITE data, and the configuration data are each modulated at a different frequency band than one another. In some embodiments, the HM data, the BIT data, the BITE data, and the configuration data are each modulated using a different modulation technique than one another.

In one or more embodiments, the vehicle is one of an airborne vehicle, a terrestrial vehicle, or a marine vehicle.

In at least one embodiment, at least a portion of the maintenance data is modulated by a modulation technique of frequency modulation (FM), amplitude modulation (AM), phase-shift keying (PSK), binary PSK (BPSK), quadrature PSK (QPSK), differential PSK (DPSK), differential QPSK (DQPSK), offset QPSK (OQPSK), frequency-shift keying (FSK), audio frequency-shift keying (AFSK), multi-frequency shift keying (MFSK), dual-tone multi-frequency (DTMF), amplitude-shift keying (ASK), on-off keying (OOK), quadrature amplitude modulation (QAM), continuous phase modulation minimum-shift keying (CPMMSK), Gaussian minimum-shift keying (GMSK), continuous-phase frequency-shift keying (CPFSK), orthogonal frequency-division multiplexing (OFDM), Trellis coded modulation (TCM), spread-spectrum techniques direct-sequence spread spectrum (DSSS), Chirp spread spectrum (CSS), or frequency-hopping spread spectrum (FHSS).

In one or more embodiments, the unit is an onboard maintenance system unit, a safety/mission critical system network unit, a flight management computer, or an avionics unit. In some embodiments, the avionics unit is a communications unit, a navigation unit, a collision avoidance unit, a terrain awareness unit, a flight control unit, a maintenance unit, a flight recorder unit, a weather unit, or an in-flight entertainment unit.

In at least one embodiment, a system for generating and transmitting maintenance data from a unit on a vehicle comprises an auxiliary power line connected to the unit and a primary power line connected to the unit. In one or more embodiments, the unit is powered by the auxiliary power line or the primary power line. The system further comprises at least one modulator (e.g., contained within a modem) of the unit to modulate at least a portion of the maintenance data to generate at least one modulated signal, which is transmitted from the unit via the auxiliary power line.

In one or more embodiments, the system further comprises at least one processor of the unit to obtain the maintenance data for operational electronics of the unit. In some embodiments, the system further comprises at least one memory of the unit to store the maintenance data for operational electronics of the unit.

In one or more embodiments, the modems of the disclosed method and system comprise modulators to modulate signals to generate modulated signals and/or demodulators to demodulate modulated signals to generate demodulated signals.

The features, functions, and advantages can be achieved independently in various embodiments of the present disclosure or may be combined in yet other embodiments.

DRAWINGS

These and other features, aspects, and advantages of the present disclosure will become better understood with regard to the following description, appended claims, and accompanying drawings where:

FIGS. 6A-6D together show a flow chart showing the disclosed method for operating a unit on a vehicle, during dataload mode, operational mode, maintenance mode, and data retrieval, in accordance with at least one embodiment of the present disclosure.

Figure 7:
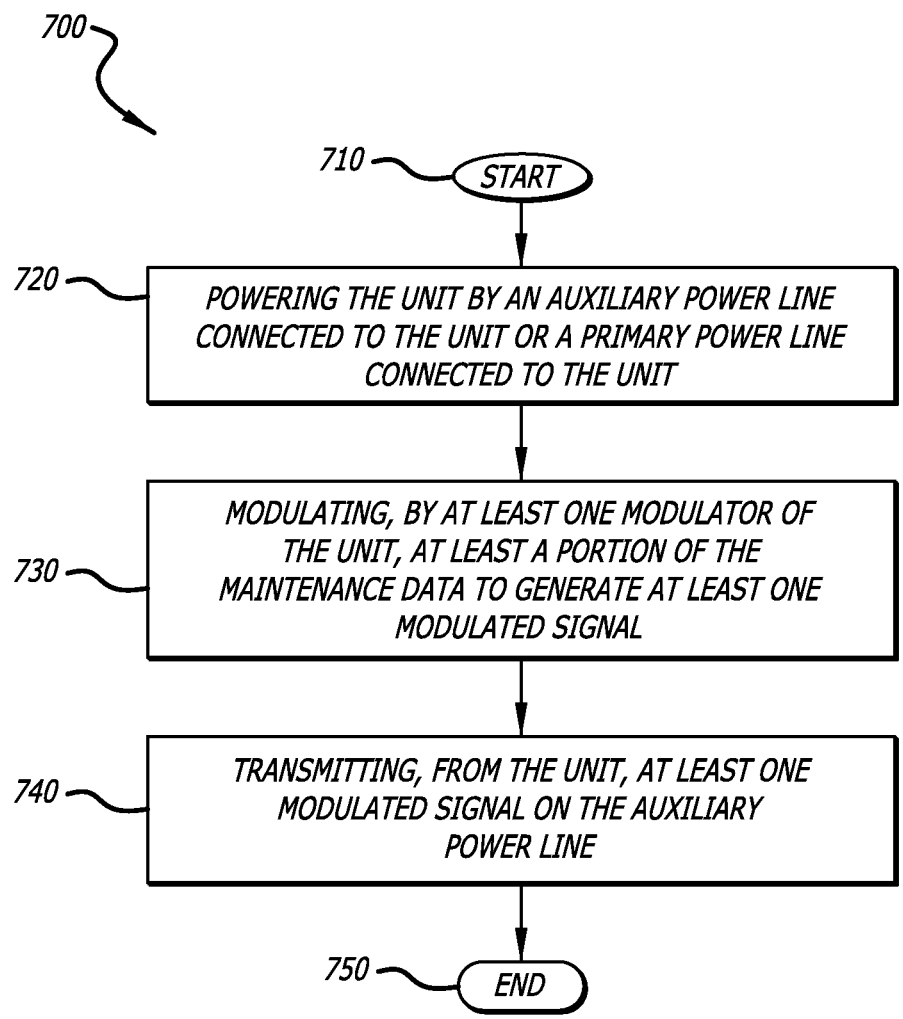

FIG. 7 is a flow chart showing the disclosed method for generating and transmitting maintenance data from a unit on a vehicle, in accordance with at least one embodiment of the present disclosure.

DESCRIPTION

The methods and apparatus disclosed herein provide an operative system for maintenance over an auxiliary power line. In one or more embodiments, the system of the present disclosure provides a solution to the existing problem of limited to no access to units (e.g., electronics devices) installed within a given vehicle platform (e.g., an aircraft) in regards to maintenance activities (e.g., retrieving maintenance data from the units). In particular, the disclosed system provides an architecture using a digital source controller, coupled to all of the units of interest, to retrieve the maintenance related data from the units. When diagnosing a particular unit, the digital source controller has the ability to simply power up only the particular unit of interest, instead of needing to power up the entire vehicle to retrieve the desired information off of the unit.

The disclosed multi-spectral maintenance over auxiliary power line system provides the ability of a vehicle (e.g., aircraft) to autonomously respond to the overall health of the vehicle during all phases (e.g., during all flight phases and during pre/post flight times with the aircraft powered down). In particular, the disclosed system provides increased affordable access to supportability data (e.g., diagnostics, prognostics, maintainability, testability, dataload, configuration management, etc.) by separating the maintenance communications from the safety/mission critical communications.

In one or more embodiments, the present disclosure provides a method of testing avionic systems without the removal of equipment by integrating the traditional support interfaces (e.g., recommended standard (RS)-232, RS-485, and/or Ethernet interfaces) within the disclosed multi-spectrum communication network. In addition, the present disclosure provides a common interconnect solution for dataloading avionics units, while maintaining compliancy with the aeronautical radio incorporated (ARINC) 615A standard, by either powering up the unit of interest via the aircraft power or by using an auxiliary power to power up the individual unit.

The multi-spectral digital source collector and network controller employed by the disclosed system provides the communications translation between the multi-spectral communications and the onboard/off-board communications, plus provides host health management (e.g., condition based management, built-in test management, parts tracking, etc.) functions (e.g., self-assessment, usage and component tracking, real-time health information, and projected vehicle/system/unit/component health).

In at least one embodiment, the disclosed system provides cost and performance benefits by extending the useful life of entire avionics systems, increasing aircraft availability, decreasing operations and sustainment costs, reducing the logistics footprint, and enabling an increased based capability that will help lead to fully integrated adaptive (e.g., autonomous) controls as envisioned for a "zero maintenance aircraft". The present disclosure also provides a means to eliminate the need for a special test station or test equipment, which is conventionally used for the retrieval of maintenance data off of units and only available at specific maintenance locations.

In the following description, numerous details are set forth in order to provide a more thorough description of the system. It will be apparent, however, to one skilled in the art, that the disclosed system may be practiced without these specific details. In the other instances, well known features have not been described in detail so as not to unnecessarily obscure the system.

Embodiments of the present disclosure may be described herein in terms of functional and/or logical components and various processing steps. It should be appreciated that such components may be realized by any number of hardware, software, and/or firmware components configured to perform the specified functions. For example, an embodiment of the present disclosure may employ various integrated circuit components (e.g., memory elements, digital signal processing elements, logic elements, look-up tables, or the like), which may carry out a variety of functions under the control of one or more processors, microprocessors, or other control devices. In addition, those skilled in the art will appreciate that embodiments of the present disclosure may be practiced in conjunction with other components, and that the system described herein is merely one example embodiment of the present disclosure.

For the sake of brevity, conventional techniques and components related to retrieving maintenance data from units, and other functional aspects of the system (and the individual operating components of the systems) may not be described in detail herein. Furthermore, the connecting lines shown in the various figures contained herein are intended to represent example functional relationships and/or physical couplings between the various elements. It should be noted that many alternative or additional functional relationships or physical connections may be present in an embodiment of the present disclosure.

Figure 1A:
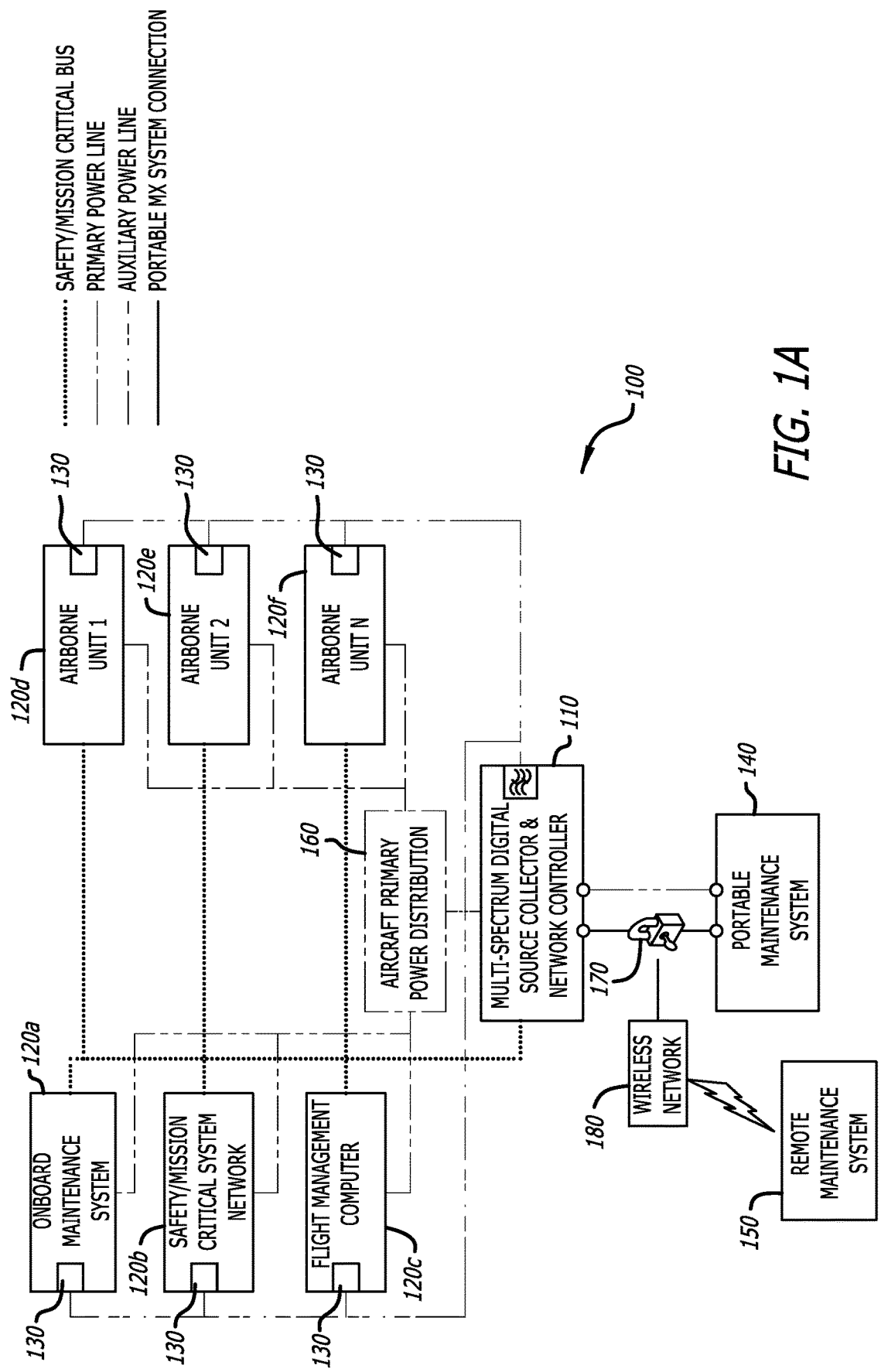
FIG. 1A is a diagram showing the disclosed system for retrieving maintenance data from a unit on a vehicle, in accordance with at least one embodiment of the present disclosure.

FIG. 1A is a diagram 100 showing the disclosed system for retrieving maintenance data from a unit 120 on a vehicle, in accordance with at least one embodiment of the present disclosure. In this figure, the system comprises a multi-spectrum digital source collector and network controller (also referred to as a digital source controller) 110, a plurality of units 120, and an aircraft primary power distribution unit 160.

The plurality of units 120 are units that are employed by a vehicle (e.g., an aircraft) (not shown). The units 120 in FIG. 1A are shown to comprise an onboard maintenance system unit 120a, a safety/mission critical system network unit 120b, a flight management computer 120c, and avionics units (e.g., an airborne units) 120d, 120e, 120f. However, it should be noted that in other embodiments, the units 120 may be different types of units other than the types of units that are shown. In one or more embodiments, for example, the avionics units 120d, 120e, 120f may be various different types of avoinics units including, but not limited to, a communications unit, a navigation unit, a collision avoidance unit, a terrain awareness unit, a flight control unit, a maintenance unit, a flight recorder unit, a weather unit, and an in-flight entertainment unit. It should be noted that in one or more embodiments, the vehicle may be an airborne vehicle (e.g., an aircraft or satellite), a terrestrial vehicle (e.g., a truck or train), or a marine vehicle (e.g., a boat or submarine). Additionally, in one or more embodiments, the vehicle may comprise more or less units than the six units 120 that are shown in FIG. 1A.

In addition, it should be noted that each of the disclosed units 120 of the disclosed system includes a node 130, which is not found in conventional units. Details of the nodes 130 will be discussed in the description of FIGS. 3, 4, and 5.

Additionally, in FIG. 1A, the units 120 are shown to be connected to an aircraft primary power distribution unit 160 via a primary power line. The primary power line is the main power line within the vehicle that is used to power the units 120 of the vehicle during its normal operation. During normal operation of the vehicle, the aircraft primary power distribution unit 160 distributes power to the units 120, as needed, within the vehicle.

Also in FIG. 1A, the units 120 are shown to be connected to a safety/mission critical bus. The safety/mission critical bus is used to communicate safety and/or mission critical data to and from the units 120.

In addition, the digital source controller 110 is shown to be connected to the units 120 via an auxiliary power line. It should be noted that the digital source controller 110 may be housed within the vehicle or located at a remote location away from the vehicle. The digital source controller 110 may use the auxiliary power line to power the units 120 and/or to collect maintenance data from the units 120.

The digital source controller 110 is also shown to be connected to a portable maintenance system (e.g., a laptop computer, tablet, or smart phone) 140. In some embodiments, the portable maintenance system 140 may be stationary (e.g., a server). A user may use the portable maintenance system 140 to control (e.g., by sending a command(s)) the digital source controller 110 to power the units 120 via the digital source controller 110 and to retrieve maintenance data from the units 120 via the digital source controller 110. Although FIG. 1A shows the digital source controller 110 connected to the portable maintenance system 140 via wire, the digital source controller 110 may be connected to the portable maintenance system 140 via wire or wirelessly. In addition, in one or more embodiments, the digital source controller 110 is connected to the portable maintenance system 140 via a firewall 170 for security of the maintenance data.

In addition, the digital source controller 110 is shown to be connected to a remote maintenance system (e.g., a computer or server) 150, which is located in a remote location away from the vehicle. A user may use the remote maintenance system 150 to control (e.g., by sending a command(s)) the digital source controller 110 to power the units 120 via the digital source controller 110 and to retrieve maintenance data from the units 120 via the digital source controller 110. Although, in this figure, the digital source controller 110 is shown to be connected to the remote maintenance system 150 wirelessly, the digital source controller 110 may be connected to the remote maintenance system 150 via wire or wirelessly. In addition, in one or more embodiments, the digital source controller 110 is connected to the remote maintenance system 150 via a firewall 170 for security of the maintenance data.

During operation of the disclosed system, when the vehicle is operating normally (e.g., when the aircraft is in flight), the aircraft primary power distribution unit 160 of the vehicle provides power to the units 120, as needed for the operation (in normal operational mode) of the units 120, via the primary power line. Also, when the units 120 are operating, the units 120 collect maintenance data for their operational electronics during operation. This maintenance data is stored within the nodes 130 of the units 120. Details of the collection of maintenance data by the units 120 will be discussed in detail in the description of FIG. 5.

In one or more embodiments, the maintenance data may be health management (HM) data (e.g., diagnostic or prognostic data recorded during operational mode of the units 120), built in test (BIT) data (e.g., data regarding registers failing during operation of the units 120 in operational mode), built in test equipment (BITE) data (e.g., measurement data recorded during testing of the units 120 during a measurement mode), and/or configuration data (e.g., configuration profiles for the operational electronics of the units 120, which may include hardware (HW) part numbers for the units 120 and software (SW) version numbers for software used by the units 120).

A user may use the digital source controller 110 to retrieve the maintenance data from the nodes 130 of the units 120 via the auxiliary power line. The user may operate the digital source controller 110 directly and/or operate the digital source controller 110 remotely by the portable maintenance system 140 and/or the remote maintenance system 150.

When the vehicle is operating normally and the user wants to retrieve maintenance data off of a particular unit 120, the user will command the digital source controller 110 to interrogate the unit 120 of interest for the specific maintenance data the user desires. The digital source controller 110 will then interrogate the unit 120 for the specific maintenance data by transmitting a request signal to the unit 120 of interest via the auxiliary power line. The request signal will be transmitted over the auxiliary power line by using broadband over power line (BPL) techniques.

After the unit 120 of interest receives the request signal, the unit 120 will transmit the requested maintenance data in a data signal to the digital source controller 110 via the auxiliary power line using BPL techniques. If the user requested the maintenance data by operating the digital source controller 110 remotely via the portable maintenance system 140 or the remote maintenance system 150, the digital source controller 110 will forward the maintenance data to the specific system (e.g., the portable maintenance system 140 or the remote maintenance system 150) that the user used to command to the digital source controller 110.

When the vehicle is not operating normally (e.g., the aircraft is landed and shut down for pre-flight or post-flight) and the user wants to retrieve maintenance data off of a particular unit 120, the user will command the digital source controller 110 to power the particular unit 120 via the auxiliary power line. In one or more embodiments, the digital source controller 110 will itself supply the power to auxiliary power line. In some embodiments, the user will use the portable maintenance system 140 and/or the remote maintenance system 150 to command the digital source controller 110 to power the auxiliary power line.

Then, the user will command the digital source controller 110 to interrogate the unit 120 of interest for the specific desired maintenance data. In some embodiments, the user will use the portable maintenance system 140 and/or the remote maintenance system 150 to command the digital source controller 110 to interrogate the unit 120 of interest for the desired maintenance data. The digital source controller 110 will then interrogate the unit 120 for the specific maintenance data by transmitting a request signal to the unit 120 of interest via the auxiliary power line. The request signal will then be transmitted over the auxiliary power line by using BPL techniques. After the unit 120 of interest receives the request signal, the unit 120 will transmit the requested maintenance data in a data signal to the digital source controller 110 via the auxiliary power line using BPL techniques. If the user requested the maintenance data by operating the digital source controller 110 remotely via the portable maintenance system 140 or the remote maintenance system 150, the digital source controller 110 will forward the maintenance data to the specific system (e.g., the portable maintenance system 140 or the remote maintenance system 150) that the user used to command to the digital source controller 110.

Figure 1B:
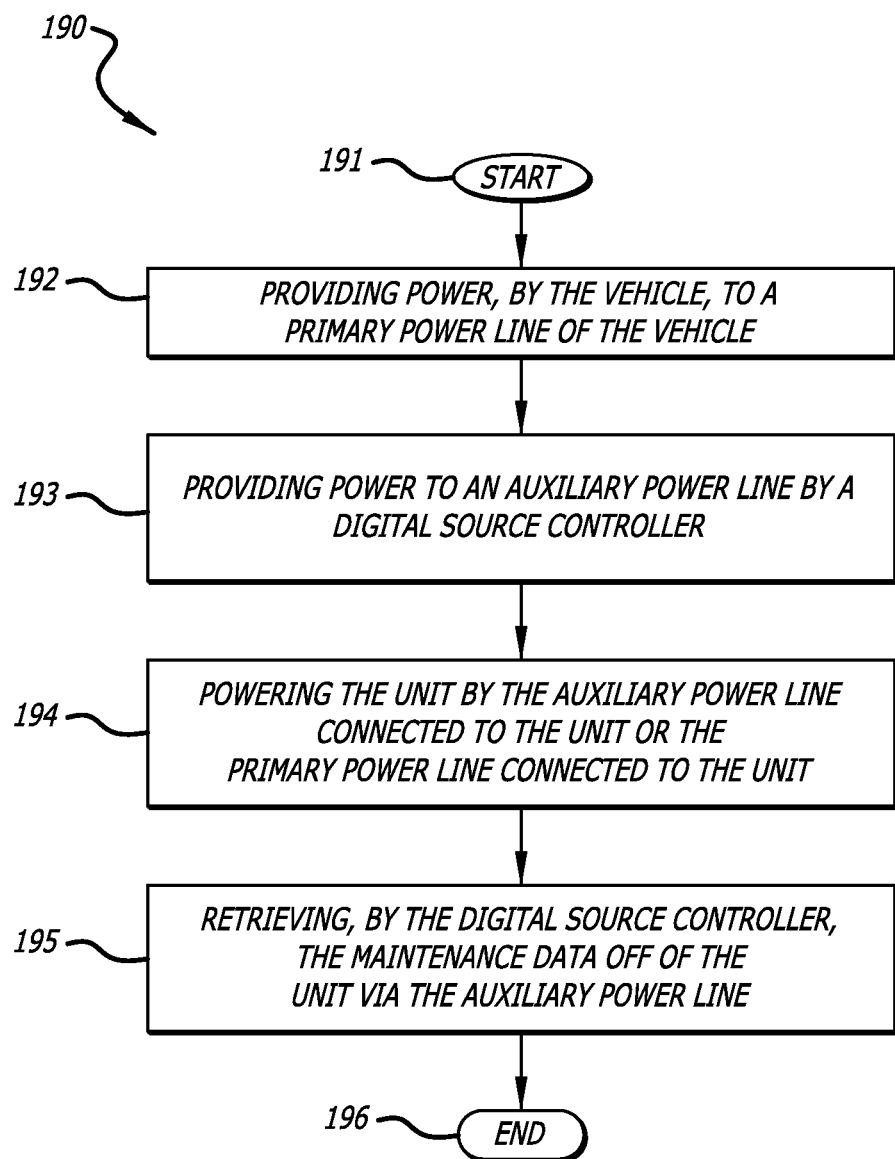
FIG. 1B is a flow chart showing the disclosed method for retrieving maintenance data from a unit on a vehicle, in accordance with at least one embodiment of the present disclosure.

FIG. 1B is a flow chart showing the disclosed method 190 for retrieving maintenance data from a unit on a vehicle, in accordance with at least one embodiment of the present disclosure. At the start 191 of the method 190, the vehicle (e.g., a battery of the vehicle) provides power to a primary power line of the vehicle 192. Also, a digital source controller provides power to an auxiliary power line 193. Then, the auxiliary power line (which is connected to the unit) or the primary power line (which is connected to the unit) powers the unit 194. The digital source controller then retrieves the maintenance data off of the unit via the auxiliary power line 195. Then, the method 190 ends 196.

Figure 2:
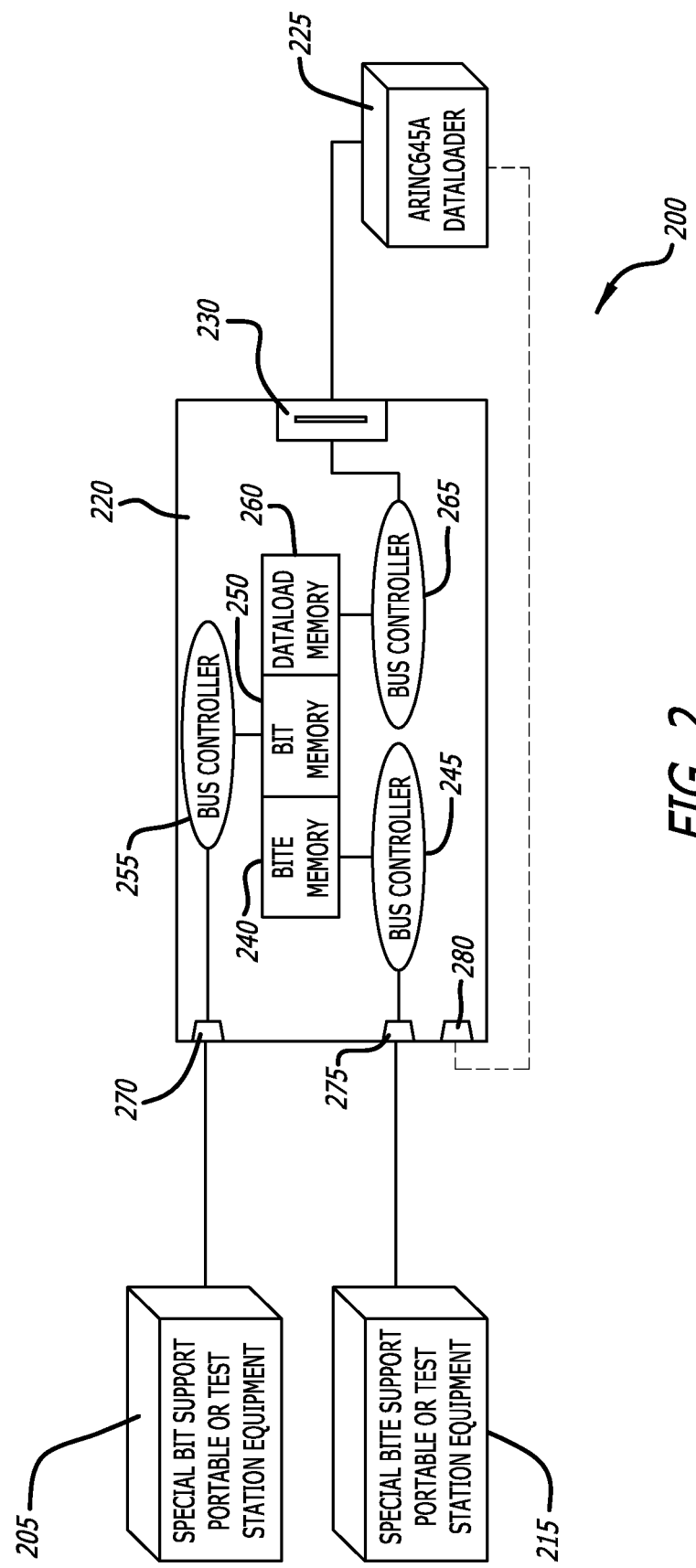
FIG. 2 is a diagram showing details of a conventional unit for a vehicle.

FIG. 2 is a diagram 200 showing details of a conventional unit 220 for a vehicle. It should be noted that the conventional unit 220 depicted in FIG. 2 shows the details of conventional units that are currently employed on aircraft. Unlike the disclosed units 120 employed by the disclosed system, the conventional units 220 typically need to be removed from their vehicle platform for retrieval of their maintenance data.

In this figure, the conventional unit 220 is shown to include built in test equipment (BITE) memory 240, built in test (BIT) memory 250, and dataload memory 260. Also, in this figure, the BITE memory 240 is shown to be connected to a serial port (e.g., an RS 232 connector or RS 485 connector) 275 via a BITE bus controller 245, the BIT memory 250 is shown to be connected to a serial port (e.g., RS 232 or RS 485 connector) 270 via a BIT bus controller 255, and the dataload memory 260 is shown to be connected to a connector (e.g., an ARINC 600 connector) 230 via a dataload bus controller 265. Also in this figure, special BIT support portable or test station equipment 205 is connected via wire to serial port 270 of the conventional unit 220, special BITE support portable or test station equipment 215 is connected via wire to serial port 275 of the conventional unit 220, and a dataloader (e.g., an ARINC 645A dataloader) 225 is connected to via wire to connector 230 of the conventional unit 220. In some embodiments, the dataloader 225 is also connected via wire to a serial port 280 of the conventional unit 220.

Prior to operating the conventional unit 220 normally, a configuration (e.g., configuration profile) for the operational electronics (not shown) of the conventional unit 220 is loaded onto the conventional unit 220. During operation of the conventional unit 220 during a dataload mode of operation for the conventional unit 220, the configuration for the operational electronics (not shown) of the conventional unit 220 is loaded by a dataloader 225 into the dataload memory 260 via the connector 230 and the dataload bus controller 265. In some embodiments, the configuration is loaded by the dataloader 225 into dataload memory 260 via serial port 280.

After the configuration is loaded into the dataload memory 260, the dataload bus controller 265 of the conventional unit 220 configures the operational electronics (not shown) according to the configuration. After the operational electronics are configured according to the configuration, the conventional unit 220 is ready to operate normally.

During operation of the conventional unit 220 during operational mode, the operational electronics of the conventional unit 220 operate normally. While the operational electronics are operating normally, the BIT bus controller 255 obtains BIT data, and the BIT data is then stored in the BIT memory 250. After the conventional unit 220 is finished operating normally, a maintenance mode for the conventional unit 220 may be run.

During operation of the conventional unit 220 during maintenance mode, the operational electronics are not operating normally, but rather the BITE bus controller 245 performs tests on the operational electronics and obtains BITE data from the testing. The BITE data is then stored in the BITE memory 240 of the conventional unit 220.

After the BITE data and BIT data are obtained and stored in the BITE memory 240 and BIT memory 250, respectively, it may be desired to retrieve the BITE data and BIT data for review and analysis. For retrieval of the BITE data and the BIT data, in one or more embodiments, the conventional unit 220 will be removed from the vehicle platform it is installed within and connected to special BIT support portable or test station equipment 205 and special BITE support portable or test station 215.

During data retrieval, the special BIT support portable or test station equipment 205 will retrieve the BIT data from the BIT data memory 250, and the special BITE portable or test station equipment 215 will retrieve the BITE data from the BITE memory 240. After the BIT data and the BITE data have been retrieved, the conventional unit 220 will be disconnected from the special BITE portable or test station equipment 215 and the special BIT support portable or test station equipment 205. Then, the conventional unit 220 will be reinstalled on the vehicle platform for its normal operation.

Figure 3:
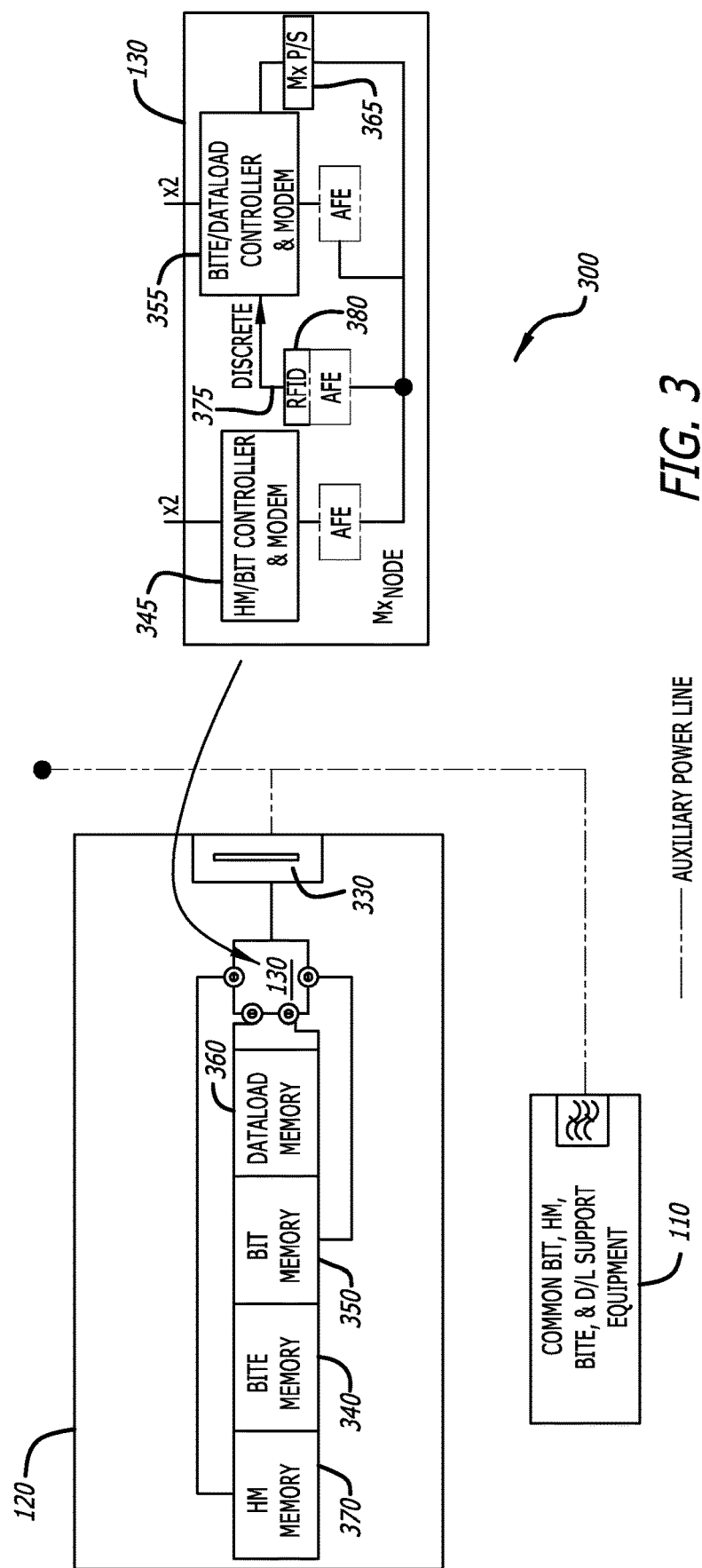
FIG. 3 is a diagram showing the details of one of the units of the disclosed system of FIG. 1, in accordance with at least one embodiment of the present disclosure.

FIG. 3 is a diagram 300 showing the details of one of the units 120 of the disclosed system of FIG. 1, in accordance with at least one embodiment of the present disclosure. It should be noted that this diagram 300 is a simplified diagram of the components of a disclosed unit 120 and does not show all components of the unit 120 (e.g., this diagram 300 does not show the operational electronics of the unit 120).

In this figure, the unit 120 is shown to include health management (HM) memory 370, BITE memory 340, BIT memory 350, and dataload memory 360. The HM memory 370, BITE memory 340, BIT memory 350, and dataload memory 360 are all connected to a node (e.g., a maintenance (MX) node) 130, which is connected to a connector (e.g., an ARINC 600 connector) 330. The connector 330 of the unit 120 is connected to an auxiliary power line. And, the unit 120 is connected to a digital source controller 110 via the auxiliary power line. The digital source controller 110 is able to retrieve maintenance data (HM data, BIT data, and BITE data) from the unit 120 and download a configuration (e.g., a configuration profile for the operational electronics of the unit 120) onto the unit 120 via the auxiliary power line.

Also in this figure, the node 130 is shown to comprise a HM/BIT controller and modem 345 and a BITE/dataload controller and modem 355, which are each connected to analog front end electronics (AFE). The HM/BIT controller and modem 345 obtain the HM data and BIT data for the operational electronics (not shown) of the unit 120, and the BITE/dataload controller and modem 355 obtain the BITE data and configuration (e.g., configuration profile) for the operational electronics (not shown) of the unit 120.

It should be noted that, when the unit 120 is not powered, the BITE/dataload controller and modem 355 may still be operated to obtain BITE data and to load a configuration (e.g., configuration profile) for the operational electronics. A safety control signal (e.g., a discrete radio frequency identification (RFID) signal) 375 generated by RFID electronics 380 may be used to command the BITE/dataload controller and modem 355 to turn on and a maintenance power supply (Mx P/S) 365 may be used to power only the BITE/dataload controller and modem 355 for operation of the BITE/dataload controller and modem 355. Additional details regarding the operation of the unit 120 will be discussed in the description of FIG. 5.

Figure 4:
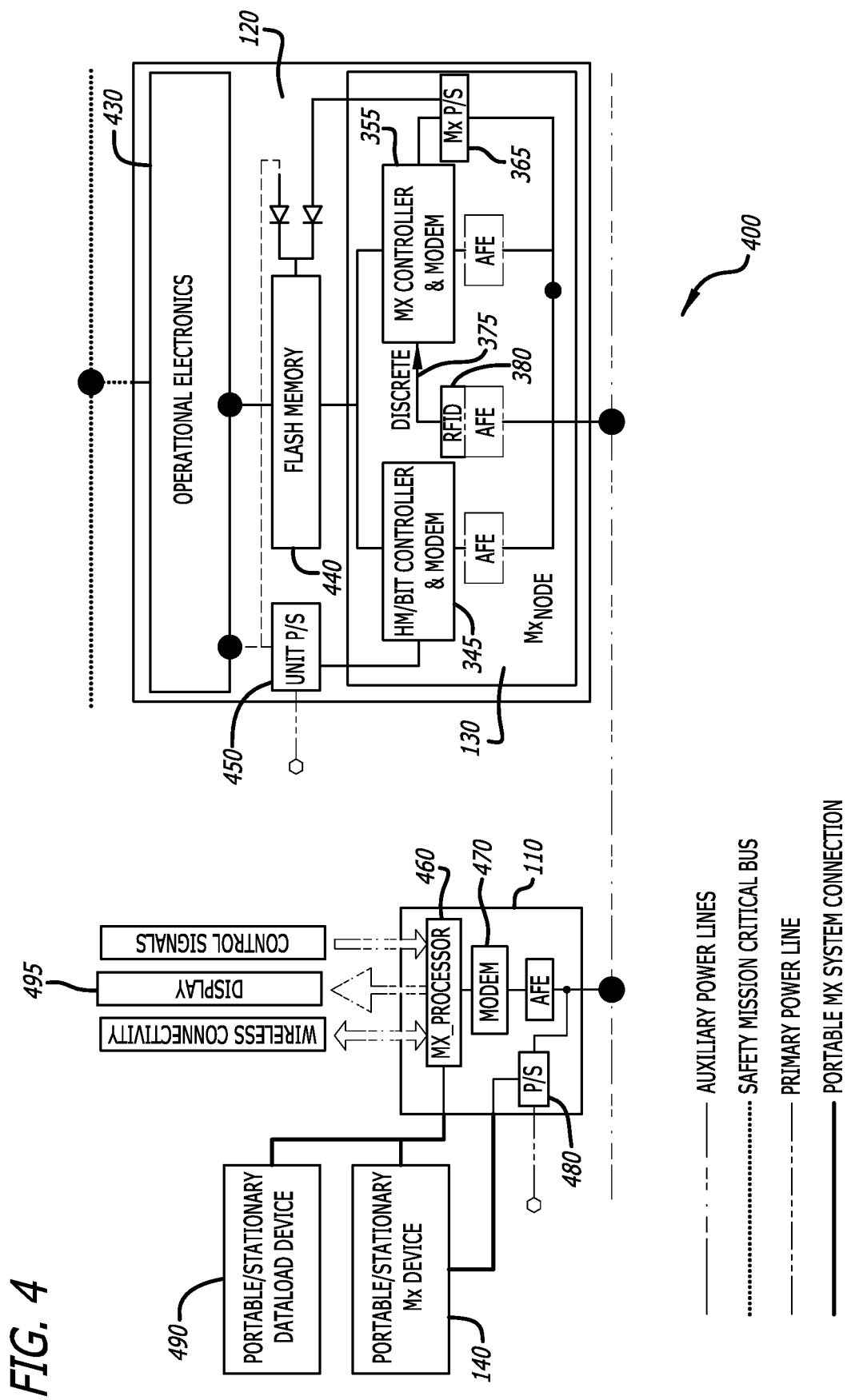
FIG. 4 is a diagram showing details of the digital source controller and one of units of the disclosed system of FIG. 1, in accordance with at least one embodiment of the present disclosure.

FIG. 4 is a diagram 400 showing details of the digital source controller 110 and one of units 120 of the disclosed system of FIG. 1, in accordance with at least one embodiment of the present disclosure. It should be noted that diagram 400 shows a simplified diagram of the components of a disclosed unit 120 and a simplified diagram of the components of a digital source controller 110.

In this figure, the unit 120 is shown to include operational electronics 430, a unit power supply (P/S) 450 that is used to power the unit 120, flash memory 440 that is used to store data including maintenance data, and the node (e.g., maintenance (MX) node) 130. The node 130 is shown to comprise a HM/BIT controller and modem 345 and a BITE/dataload controller and modem (e.g., maintenance controller and modem) 355, which are each connected to analog front end electronics (AFE). The HM/BIT controller and modem 345 obtain the HM data and BIT data for the operational electronics 430 of the unit 120, and the BITE/dataload controller and modem 355 obtain the BITE data and configuration (e.g., configuration profile) for the operational electronics 430 of the unit 120. The node is also shown to comprise a maintenance power supply (Mx P/S) 365 that may be used to power only the BITE/dataload controller and modem 355 and RFID electronics 380 for generating a safety control signal (e.g., a discrete radio frequency identification (RFID) signal) 375 to be used to command the BITE/dataload controller and modem 355 to turn on.

Also in this figure, the digital source controller 110 is shown to comprise a processor (e.g., a maintenance processor) 460, a modem 470, analog front end electronics (AFE), and a power supply (P/S) 480. The digital source controller 110 is connected to a portable or stationary dataload device 490 and a portable (or stationary) maintenance (MX) device 140 via a portable maintenance system connection, which may be wired or wireless. In addition, the digital source controller 110 is connected to the unit 120 via an auxiliary power line.

During operation, a user may operate the digital source controller 110 either directly (e.g., via a graphical user interface (GUI) displayed on a display 495) in communication with the digital source controller 110 or, alternatively, remotely via the portable or stationary dataload device 490 for downloading a configuration onto the unit 120 or remotely via the portable (or stationary) maintenance device 140 for retrieving maintenance data from the unit 120. When the user operates the digital source controller 110 remotely, the maintenance processor 460 of the digital source controller 110 will receive and process commands from the user. For example, when the user sends a command for particular maintenance data (e.g., BIT data) to the digital source controller 110, the maintenance processor 460 will process the command and generate an interrogation command (e.g., a request command) to be sent to the unit 120 for the desired maintenance data (e.g., BIT data). The modem 470 (e.g., which comprises a modulator) of the digital source controller 110 will then generate a modulated request signal for the interrogation command. The digital source controller 110 will transmit the modulated request signal to the unit 120 via the auxiliary power line.

After the unit 120 receives the modulated request signal, the HM/BIT controller and modem 345 will process the modulated request signal to determine the specific request. the HM/BIT controller and modem 345 unit 120 will then retrieve the requested maintenance data (e.g., BIT data) from memory (e.g., flash memory 440) and generate (e.g., by using a modulator within the HM/BIT controller and modem 345) a modulated data signal comprising the requested maintenance data (e.g., BIT data). The unit 120 will then transmit the modulated data signal to the digital source controller 110 via the auxiliary power line. If the user is operating the digital source controller 110 remotely, the digital source controller 110 will then forward the requested maintenance data (e.g., BIT data) to the specific system (e.g., the portable (or stationary) maintenance device 140) that the user used to command to the digital source controller 110.

Figure 5:
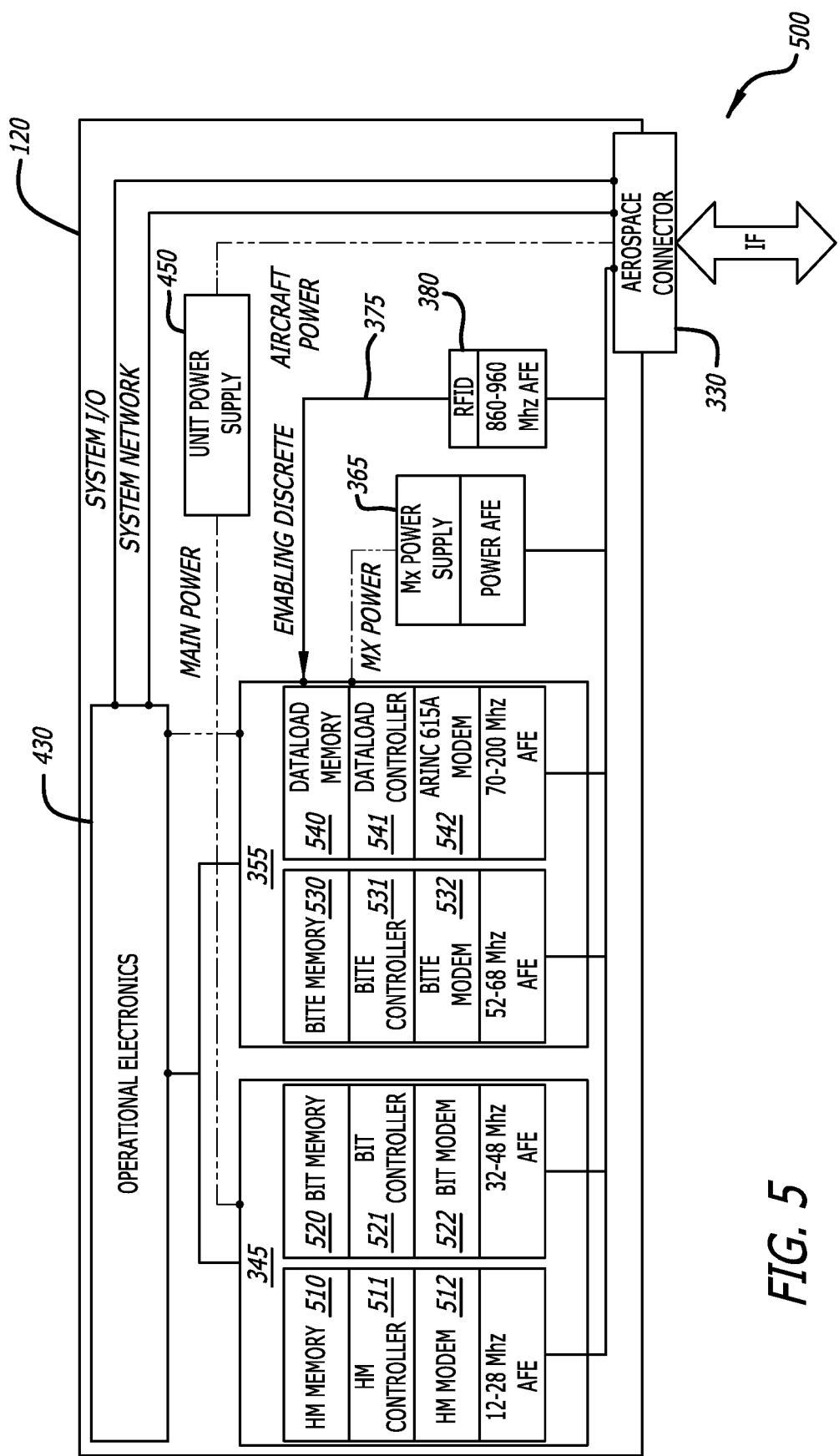
FIG. 5 is a diagram showing the details of one of units of the disclosed system of FIG. 1, in accordance with at least one embodiment of the present disclosure.
Figure 6A:
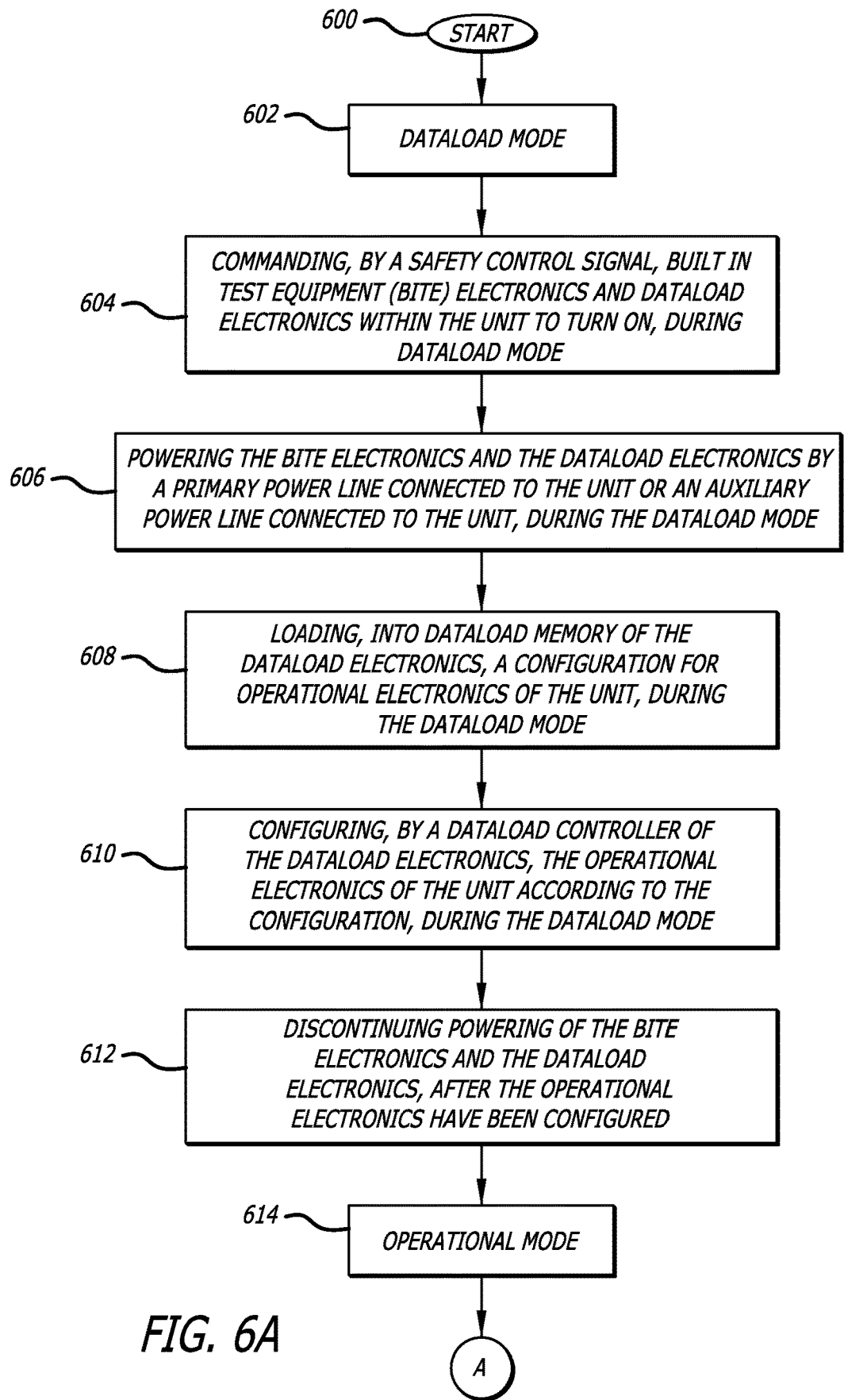
Figure 6B:
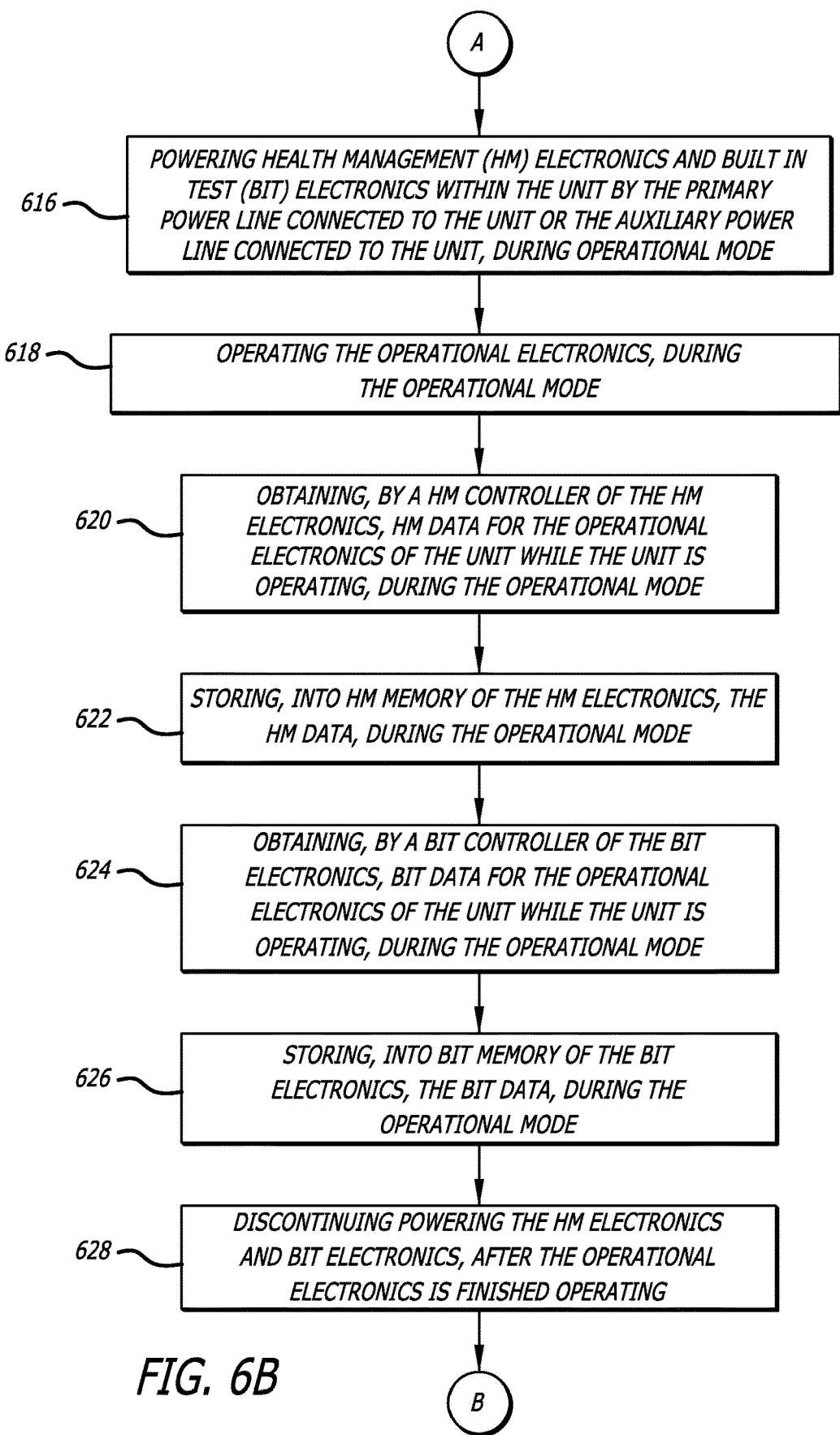
Figure 6C:
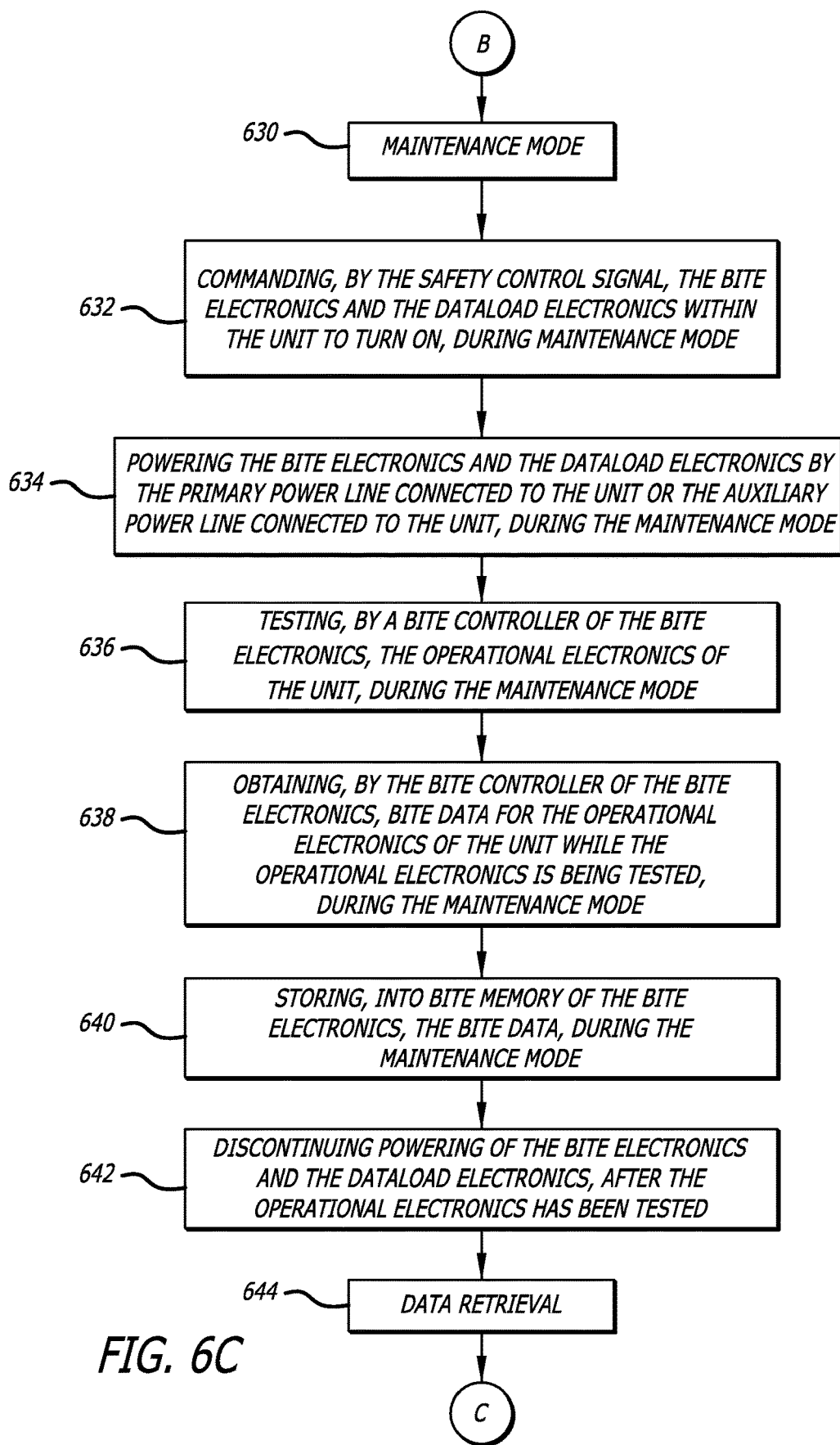
Figure 6D:
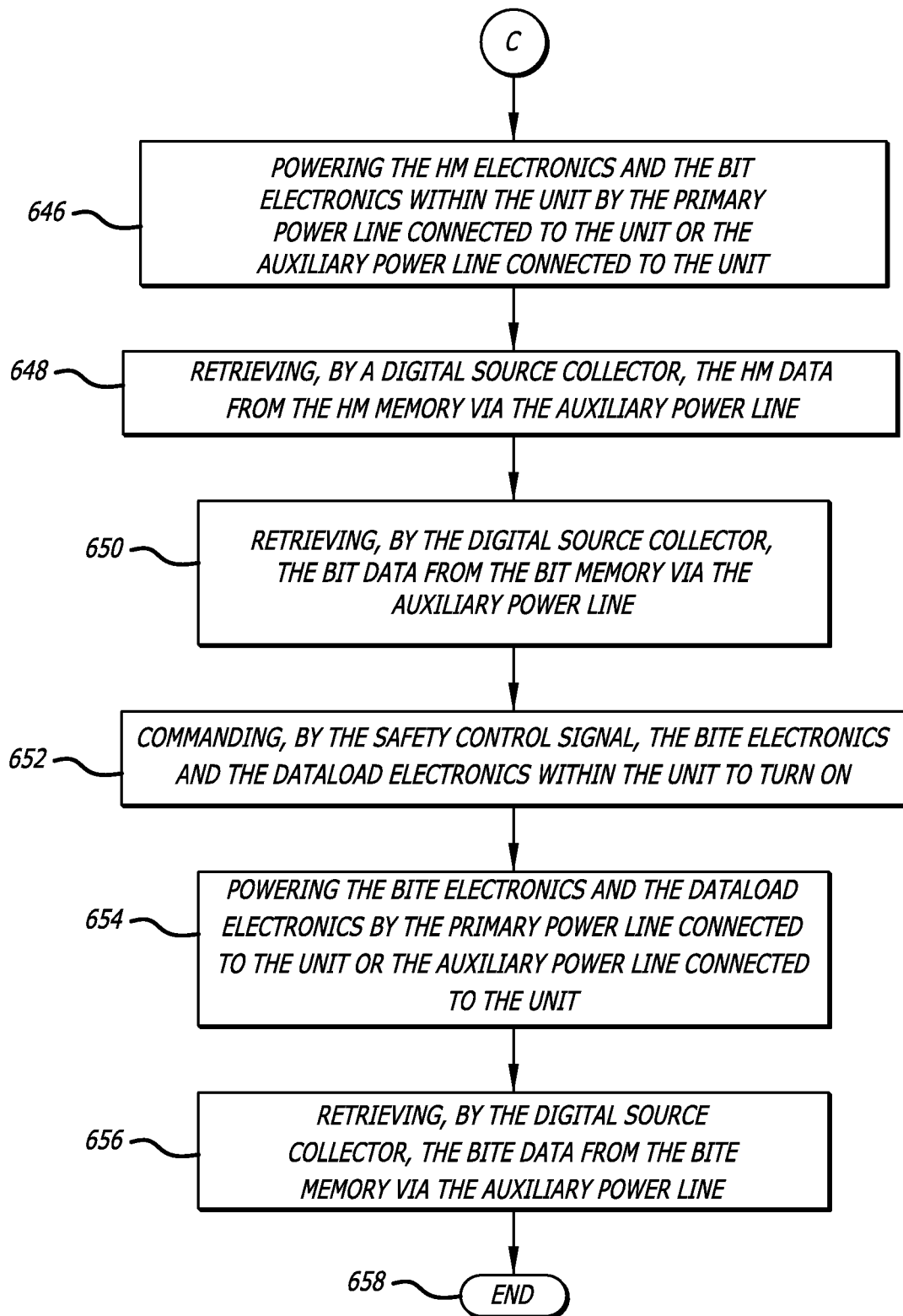

FIG. 5 is a diagram 500 showing the details of one of units 120 of the disclosed system of FIG. 1, in accordance with at least one embodiment of the present disclosure. In particular, diagram 500 shows details of the HM/BIT controller and modem 345 and the BITE/dataload controller and modem 355 of the unit 120. It should be noted that although diagram 500 does not specifically depict the node 130 of the unit 120, it is understood that the unit 120 does comprise the node 130.

In this figure, the unit 120 is shown to include operational electronics 430, a unit power supply (P/S) 450 that is used to power the unit 120, a HM/BIT controller and modem 345, and a BITE/dataload controller and modem 355. The HM/BIT controller and modem 345 obtain the HM data and BIT data for the operational electronics 430 of the unit 120, and the BITE/dataload controller and modem 355 obtain the BITE data and configuration (e.g., configuration profile) for the operational electronics 430 of the unit 120. The HM/BIT controller and modem 345 is shown to include HM memory 510, BIT memory 520, a HM controller 511, a BIT controller 521, a HM modem 512, and a BIT modem 522. And, the BITE/dataload controller and modem 355 is shown to include BITE memory 530, dataload memory 540, a BITE controller 531, a dataload controller 541, a BITE modem 532, and a dataload modem (e.g., an ARINC 615A modem) 542.

The unit 120 is also shown to comprise a maintenance power supply (Mx P/S) 365 that may be used to power only the BITE/dataload controller and modem 355, and RFID electronics 380 for generating a safety control signal (e.g., a discrete radio frequency identification (RFID) signal) 375 to be used to command the BITE/dataload controller and modem 355 to turn on.

The unit 120 is operable to operate in four different modes, which are a dataload mode, an operational mode, a maintenance mode, and a data retrieval mode. A detailed description of the operation of the unit 120 in these four modes follows.

During operation of the unit 120 in dataload mode, a safety control signal 375 (e.g., a discrete signal) generated by the RFID electronics 380 commands the BITE/dataload controller and modem 355 to turn on. Also, the maintenance power supply 365 powers the BITE/dataload controller and modem 355 from power obtained by the auxiliary power line connected to the unit 120 via the connector 330 or from power obtained by the primary power line connected to the unit 120 via the connector 330. The dataload modem 542 of the unit 120 then receives a modulated configuration signal (e.g., a modulated signal comprising a configuration profile for the operational electronics 430) from the auxiliary power line. It should be noted that in some embodiments, the modulated configuration signal may be transmitted on a specific frequency band (e.g., 70-200 Megahertz (MHz)). The dataload modem 542 (e.g., which comprises a demodulator) then demodulates the modulated configuration signal to determine the configuration. The dataload memory 540 then stores the configuration. Then, the dataload controller 541 configures the operational electronics 430 according to the configuration. After the operational electronics 430 are configured, the BITE/dataload controller and modem 355 are no longer powered.

During operation of the unit 120 in operational mode, the unit power supply 450 powers the operational electronics 430 and the HM/BIT controller and modem 345 from power obtained by the auxiliary power line connected to the unit 120 via the connector 330 or from power obtained by the primary power line connected to the unit 120 via the connector 330. After the operational electronics 430 are powered, the operational electronics 430 operate normally. While the operational electronics are operating normally, the HM controller 511 obtains HM data for the operational electronics 430, and the BIT controller 521 obtains BIT data for the operational electronics 430. The HM data is then stored in HM memory 510 and the BIT data is also stored in BIT memory 520. After the operational electronics 430 are finished operating, the operational electronics 430 are no longer powered.

During operation of the unit 120 in maintenance mode, a safety control signal 375 (e.g., a discrete signal) generated by the RFID electronics 380 commands the BITE/dataload controller and modem 355 to turn on. Also, the maintenance power supply 365 powers the BITE/dataload controller and modem 355 from power obtained by the auxiliary power line connected to the unit 120 via the connector 330 or from power obtained by the primary power line connected to the unit 120 via the connector 330. The BITE controller 531 performs tests on the operational electronics 430, and obtains BITE data from the operational electronics 430 during the testing. The BITE data is then stored in the BITE memory 530. After the testing of the operational electronics 430 is complete, the BITE/dataload controller and modem 355 is no longer powered.

During operation of the unit 120 in data retrieval mode, for the retrieval of HM data and BIT data, the unit power supply 450 powers the HM/BIT controller and modem 345 from power obtained by the auxiliary power line connected to the unit 120 via the connector 330 or from power obtained by the primary power line connected to the unit 120 via the connector 330. The BIT modem 522 of the unit 120 then receives a modulated request signal (e.g., a modulated signal comprising a request for BIT data for the operational electronics 430) from a digital source controller 110 via the auxiliary power line. Also, the HM modem 512 of the unit 120 receives a modulated request signal (e.g., a modulated signal comprising a request for HM data for the operational electronics 430) from the digital source controller 110 via the auxiliary power line. It should be noted that in some embodiments, the modulated request signal for the BIT data may be transmitted on a specific frequency band (e.g., 32-48 MHz), and the modulated request signal for the HM data may be transmitted on a different specific frequency band (e.g., 12-28 MHz).

The BIT modem 522 (e.g., which comprises a demodulator) then demodulates the modulated request signal for the BIT data to determine the specific request, and the HM modem 512 (e.g., which comprises a demodulator) demodulates the modulated request signal for the HM data to determine the specific request. The BIT controller 521 then retrieves the requested BIT data from the BIT memory 520, and the HM controller 511 retrieves the requested HM data from the HM memory 510. Then, the BIT modem 522 (e.g., which comprises a modulator) generates a modulated BIT data signal comprising the requested BIT data and the HM modem 512 (e.g., which comprises a modulator) generates a modulated HM data signal comprising the requested HM data. It should be noted that in some embodiments, the modulated BIT data signal may be transmitted on a specific frequency band (e.g., 32-48 MHz), and the modulated HM data signal may be transmitted on a different specific frequency band (e.g., 12-28 MHz). Then, the unit 120 transmits the modulated BIT data signal and the modulated HM data signal to the digital source controller 110 via the auxiliary power line.

Also during data retrieval mode, for the retrieval of BITE data, a safety control signal 375 (e.g., a discrete signal) generated by the RFID electronics 380 commands the BITE/dataload controller and modem 355 to turn on. Also, the maintenance power supply 365 powers the BITE/dataload controller and modem 355 from power obtained by the auxiliary power line connected to the unit 120 via the connector 330 or from power obtained by the primary power line connected to the unit 120 via the connector 330. Then, The BITE modem 532 of the unit 120 then receives a modulated request signal (e.g., a modulated signal comprising a request for BITE data for the operational electronics 430) from a digital source controller 110 via the auxiliary power line. In one or more embodiments, the modulated request signal for the BITE data may be transmitted on a specific frequency band (e.g., 52-68 MHz).

The BITE modem 532 (e.g., which comprises a demodulator) then demodulates the modulated request signal for the BITE data to determine the specific request. The BITE controller 531 then retrieves the requested BITE data from the BITE memory 530. Then, the BITE modem 532 (e.g., which comprises a modulator) generates a modulated BITE data signal comprising the requested BITE data. It should be noted that in some embodiments, the modulated BITE data signal may be transmitted on a specific frequency band (e.g., 52-68 MHz). Then, the unit 120 transmits the modulated BITE data signal to the digital source controller 110 via the auxiliary power line.

After all of the requested maintenance data (e.g., BIT data, HM data, and BITE data) has been transmitted from the unit 120 to the digital source controller 110, the HM/BIT controller and modem 345 and the BITE/dataload controller and modem 355 are no longer powered.

In addition, it should be noted that in one or more embodiments, the different modulation signals may each be generated using various different modulation techniques. Different modulation techniques that may be used to generate the different modulation signals include, but are not limited to, frequency modulation (FM), amplitude modulation (AM), phase-shift keying (PSK), binary PSK (BPSK), quadrature PSK (QPSK), differential PSK (DPSK), differential QPSK (DQPSK), offset QPSK (OQPSK), frequency-shift keying (FSK), audio frequency-shift keying (AFSK), multi-frequency shift keying (MFSK), dual-tone multi-frequency (DTMF), amplitude-shift keying (ASK), on-off keying (OOK), quadrature amplitude modulation (QAM), continuous phase modulation minimum-shift keying (CPMMSK), Gaussian minimum-shift keying (GMSK), continuous-phase frequency-shift keying (CPFSK), orthogonal frequency-division multiplexing (OFDM), Trellis coded modulation (TCM), spread-spectrum techniques direct-sequence spread spectrum (DSSS), Chirp spread spectrum (CSS), and frequency-hopping spread spectrum (FHSS).

FIGS. 6A-6D together show a flow chart showing the disclosed method for operating a unit on a vehicle, during dataload mode 602, operational mode 614, maintenance mode 630, and data retrieval 644 in accordance with at least one embodiment of the present disclosure. At the start 600 of the method, during dataload mode 602, a safety control signal commands built in test equipment (BITE) electronics and dataload electronics within the unit to turn on 604. Then, the BITE electronics and the dataload electronics are powered by a primary power line connected to the unit or an auxiliary power line connected to the unit, during the dataload mode 606. A configuration for operational electronic of the unit is then loaded into dataload memory of the dataload electronics, during the dataload mode 608. Then, a dataload controller of the dataload electronics configures the operational electronics of the unit according to the configuration, during the dataload mode 610. Powering of the BITE electronics and the dataload electronics is discontinued, after the operational electronics have been configured 612.

During operational mode 614, health management (HM) electronics and built in test (BIT) electronics within the unit are powered by the primary power line connected to the unit or the auxiliary power line connected to the unit 616. Then, the operational electronics operates during operational mode 618. A HM controller of the HM electronics obtains HM data for the operational electronics of the unit while the unit is operating, during the operational mode 620. Then, the HM data is stored into HM memory of the HM electronics, during the operational mode 622. A BIT controller of the BIT electronics obtains BIT data for the operational electronics of the unit while the unit is operating, during the operational mode 624. Then, the BIT data is stored into BIT memory of the BIT electronics, during the operational mode 626. Powering of the HM electronics and the BIT electronics is discontinued, after the operational electronics is finished operating 628.

During maintenance mode 630, a safety control signal commands the BITE electronics and the dataload electronics within the unit to turn on, during maintenance mode 632. The BITE electronics and the dataload electronics are then powered by the primary power line connected to the unit or the auxiliary power line connected to the unit, during the maintenance mode 634. A BITE controller of the BITE electronics then tests the operational electronics of the unit, during the maintenance mode 636. Then, the BITE controller of the BITE electronics obtains BITE data for the operational electronics of the unit while the operational electronics is being tested, during the maintenance mode 638. The BITE data is then stored into BITE memory of the BITE electronics, during the maintenance mode 640. Powering of the BITE electronics and the dataload electronics is discontinued, after the operational electronics has been tested 642.

During data retrieval 644, the HM electronics and the BIT electronics within the unit are powered by the primary power line connected to the unit or the auxiliary power line connected to the unit 646. Then, a digital source controller retrieves the HM data from the HM memory via the auxiliary power line 648. Also, the digital source controller retrieves the BIT data from the BIT memory via the auxiliary power line 650. The safety control signal commands the BITE electronics and the dataload electronics within the unit to turn on 652. Then, the BITE electronics and the dataload electronics are powered by the primary power line connected to the unit or the auxiliary power line connected to the unit 654. The digital source controller then retrieves the BITE data from the BITE memory via the auxiliary power line 656. Then, the method ends 658.

FIG. 7 is a flow chart showing the disclosed method 700 for generating and transmitting maintenance data from a unit on a vehicle, in accordance with at least one embodiment of the present disclosure. At the start 710 of the method 700, the unit is powered by an auxiliary power line connected to the unit or a primary power line connected to the unit 720. At least one modulator (e.g., of a modem) modulates at least a portion of the maintenance data to generate at least one modulated signal 730. Then, at least one modulated signal is transmitted from the unit on the auxiliary power line 740. Then, the method 700 ends 750.

Although particular embodiments have been shown and described, it should be understood that the above discussion is not intended to limit the scope of these embodiments. While embodiments and variations of the many aspects of the invention have been disclosed and described herein, such disclosure is provided for purposes of explanation and illustration only. Thus, various changes and modifications may be made without departing from the scope of the claims.

Where methods described above indicate certain events occurring in certain order, those of ordinary skill in the art having the benefit of this disclosure would recognize that the ordering may be modified and that such modifications are in accordance with the variations of the present disclosure. Additionally, parts of methods may be performed concurrently in a parallel process when possible, as well as performed sequentially. In addition, more parts or less part of the methods may be performed.

Accordingly, embodiments are intended to exemplify alternatives, modifications, and equivalents that may fall within the scope of the claims. Although certain illustrative embodiments and methods have been disclosed herein, it can be apparent from the foregoing disclosure to those skilled in the art that variations and modifications of such embodiments and methods can be made without departing from the true spirit and scope of the art disclosed. Many other examples of the art disclosed exist, each differing from others in matters of detail only. Accordingly, it is intended that the art disclosed shall be limited only to the extent required by the appended claims and the rules and principles of applicable law.

I claim:

1. A method for generating and transmitting maintenance data from a unit on a vehicle, the method comprising:
   during an operational mode, powering the unit on using a primary power distribution unit via a primary power line;
   during a maintenance mode, powering the unit on using a digital source controller via an auxiliary power line,
   wherein the unit is one of an onboard maintenance system unit, a safety/mission critical system network unit, a management computer, or an avionics unit;
   modulating, by at least one modulator of the unit, at least a portion of the maintenance data to generate at least one modulated signal; and
   transmitting, from the unit, the at least one modulated signal to the digital source controller on the auxiliary power line.

2. The method of claim 1, wherein the method further comprises obtaining, by at least one processor of the unit, the maintenance data for operational electronics of the unit, during at least one of the operational mode or the maintenance mode.

3. The method of claim 1, wherein the method further comprises storing, in at least one memory of the unit, the maintenance data for operational electronics of the unit, during at least one of the operational mode or the maintenance mode.

4. The method of claim 1, wherein the vehicle is one of an airborne vehicle, a terrestrial vehicle, or a marine vehicle.

5. The method of claim 1, wherein the at least a portion of the maintenance data is modulated by a modulation technique of one of frequency modulation (FM), amplitude modulation (AM), phase-shift keying (PSK), binary PSK (BPSK), quadrature PSK (QPSK), differential PSK (DPSK), differential QPSK (DQPSK), offset QPSK (OQPSK), frequency-shift keying (FSK), audio frequency-shift keying (AFSK), multi-frequency shift keying (MFSK), dual-tone multi-frequency (DTMF), amplitude-shift keying (ASK), on-off keying (OOK), quadrature amplitude modulation (QAM), continuous phase modulation minimum-shift keying (CPMMSK), Gaussian minimum-shift keying (GMSK), continuous-phase frequency-shift keying (CPFSK), orthogonal frequency-division multiplexing (OFDM), Trellis coded modulation (TCM), spread-spectrum techniques direct-sequence spread spectrum (DSSS), Chirp spread spectrum (CSS), or frequency-hopping spread spectrum (FHSS).

6. The method of claim 1, wherein the maintenance data comprises at least one of health management (HM) data, built in test (BIT) data, built in test equipment (BITE) data, or configuration data.

7. The method of claim 6, wherein the HM data, the BIT data, the BITE data, and the configuration data are each modulated at a different frequency band than one another.

8. The method of claim 6, wherein the HM data, the BIT data, the BITE data, and the configuration data are each modulated using a different modulation technique than one another.

9. The method of claim 1, wherein the unit comprises at least one processor.

10. The method of claim 1, wherein the avionics unit is one of a communications unit, a navigation unit, a collision avoidance unit, a terrain awareness unit, a flight control unit, a maintenance unit, a flight recorder unit, a weather unit, or an in-flight entertainment unit.

11. The method of claim 1, wherein unit comprises at least one memory.

12. A system for generating and transmitting maintenance data from a unit on a vehicle, the system comprising:
   an auxiliary power line connected to the unit and to a digital source controller,
   wherein during a maintenance mode, the unit is powered on using the digital source controller via the auxiliary power line;
   a primary power line connected to the unit and to a primary power distribution unit,
   wherein during an operational mode, the unit is powered on using the primary power distribution unit via the primary power line, and wherein the unit is one of an onboard maintenance system unit, a safety/mission critical system network unit, a management computer, or an avionics unit; and at least one modulator of the unit to modulate at least a portion of the maintenance data to generate at least one modulated signal, which is transmitted from the unit to the digital source controller via the auxiliary power line.

13. The system of claim 12, wherein the system further comprises at least one processor of the unit to obtain the maintenance data for operational electronics of the unit.

14. The system of claim 12, wherein the system further comprises at least one memory of the unit to store the maintenance data for operational electronics of the unit.

15. The system of claim 12, wherein the vehicle is one of an airborne vehicle, a terrestrial vehicle, or a marine vehicle.

16. The system of claim 12, wherein the at least a portion of the maintenance data is modulated by a modulation technique of one of frequency modulation (FM), amplitude modulation (AM), phase-shift keying (PSK), binary PSK (BPSK), quadrature PSK (QPSK), differential PSK (DPSK), differential QPSK (DQPSK), offset QPSK (OQPSK), frequency-shift keying (FSK), audio frequency-shift keying (AFSK), multi-frequency shift keying (MFSK), dual-tone multi-frequency (DTMF), amplitude-shift keying (ASK), on-off keying (OOK), quadrature amplitude modulation (QAM), continuous phase modulation minimum-shift keying (CPMMSK), Gaussian minimum-shift keying (GMSK), continuous-phase frequency-shift keying (CPFSK), orthogonal frequency-division multiplexing (OFDM), Trellis coded modulation (TCM), spread-spectrum techniques direct-sequence spread spectrum (DSSS), Chirp spread spectrum (CSS), or frequency-hopping spread spectrum (FHSS).

17. The system of claim 12, wherein the maintenance data comprises at least one of health management (HM) data, built in test (BIT) data, built in test equipment (BITE) data, or configuration data.

18. The system of claim 17, wherein the HM data, the BIT data, the BITE data, and the configuration data are each modulated at a different frequency band than one another.

19. The system of claim 17, wherein the HM data, the BIT data, the BITE data, and the configuration data are each modulated using a different modulation technique than one another.

20. The system of claim 12, wherein the avionics unit is one of a communications unit, a navigation unit, a collision avoidance unit, a terrain awareness unit, a flight control unit, a maintenance unit, a flight recorder unit, a weather unit, or an in-flight entertainment unit.

* * * * *